United States Patent
Nishizawa et al.

(10) Patent No.: US 7,503,869 B2
(45) Date of Patent: Mar. 17, 2009

(54) SPEED CHANGE CONTROL APPARATUS FOR TOROIDAL CVT

(75) Inventors: Hiroyuki Nishizawa, Tajima (JP); Kisaburo Hayakawa, Nagoya (JP); Shuzo Sanda, Nagoya (JP); Masanobu Kimura, Ama-gun (JP); Masataka Osawa, Nagoya (JP); Yuji Iwase, Mishima (JP); Naoto Tanaka, Syuntou-gun (JP); Naoki Moriguchi, Susono (JP); Masami Sugaya, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 793 days.

(21) Appl. No.: 10/986,391

(22) Filed: Nov. 12, 2004

(65) Prior Publication Data

US 2005/0124454 A1 Jun. 9, 2005

(30) Foreign Application Priority Data

Nov. 14, 2003 (JP) ............................. 2003-385182

(51) Int. Cl.
*F16H 15/38* (2006.01)
(52) U.S. Cl. ............................... 476/2; 476/10; 476/41; 476/42
(58) Field of Classification Search .................. 476/1, 476/2, 3, 10, 40, 42, 46, 41
See application file for complete search history.

(56) References Cited

FOREIGN PATENT DOCUMENTS

| JP | 8-233085 | 9/1996 |
| JP | 2002349691 | 12/2002 |

*Primary Examiner*—William C Joyce
(74) *Attorney, Agent, or Firm*—Oblon, Spivak, McClelland, Maier & Neustadt, P.C.

(57) ABSTRACT

A controller determines a target gear ratio from an accelerator opening and a vehicle speed. The controller determines the stroke of a trunnion on the basis of the difference between present inclination and a target inclination, thereby to control stroke by a hydraulic control valve. The stroke is corrected according to input/output disc pushing force.

11 Claims, 8 Drawing Sheets

AT STABLE SPEED

(F1=F2 → STROKE=0)

Fig. 8 (a)

AT ABRUPT CHANGE OF INPUT TORQUE

(F1≠F2 → STROKE≠0)

Fig. 8 (b)

Fig. 9

SPEED CHANGE CONTROL APPARATUS FOR TOROIDAL CVT

BACKGROUND OF THE INVENTION

1. Field of the Invention

The present invention relates to a speed change control apparatus for a toroidal CVT and, more particularly, to control of an offset amount of a roller when a speed is changed.

2. Description of the Related Art

In the related art, a variety of types of continuous variable transmissions (CVT) have been known, including the toroidal CVT. A toroidal CVT is provided with input/output discs and a roller for transmitting a power by frictional engagement between the input/output discs.

The input/output discs have an overall shape similar to a circular cone having a slope of a circular arc. The input/output discs are arranged such that their protruding central portions oppose to each other, and the cross sections in the plane at which they contact each other form a rectangle from which a semicircle has been cut out. Further, a roller makes contact with the periphery of the input disc and with the inner side of the output disc so that the rotation of a portion of the input disc removed from the axis can be transmitted at a low speed reduction ratio to the portion of the output disc close to the axis. The gear ratio can be determined by changing that contact position.

Moreover, this roller is so supported by a member called the "trunnion" so that the roller can rotate and change its position of contact with the input/output discs. The angle of the trunnion axis is the inclination (or an angle of inclined rotation) of the rotating plane of the roller with respect to the input/output discs. In the toroidal CVT, the gear ratio is determined by the inclination.

When this inclination is to be varied, moreover, the trunnion is moved in the direction perpendicular to the axis of rotation of the input/output discs. In other words, the axis of rotation of the roller is offset from the position, at which point the axis of rotation of the roller and the axis of rotation of the input/output discs intersect at a right angle. This offset amount is called the "trunnion stroke". As a result, the roller is subjected to a force in a direction to vary the inclination to control the gear ratio.

In the toroidal CVT, therefore, the inclination or the angle of rotation of the roller supported by the trunnion determined by the trunnion axis, and the offset amount of the trunnion (i.e., the trunnion stroke) in the axial direction, are detected. Thus, the gear ratio is determined from the inclination, and the necessary position displacement (i.e., the offset amount=the trunnion stroke) of the roller in the trunnion axial direction is calculated based on the deviation between the present gear ratio and the target gear ratio. Then, the trunnion is displaced by a hydraulic actuator so that the trunnion stroke (or the offset amount) reaches the target. Thus, the offset amount is controlled based on the deviation of the inclination (or the gear ratio) from the target. Such control may be performed as an electronic feedback control, as disclosed in JP-A-08-233085 or the like.

Although trunnion stroke can be subjected to feedback control as described above, because various forces are applied to the trunnion, deformation in the roller supporting mechanism or the like may cause errors in the detected value of the trunnion stroke.

SUMMARY OF THE INVENTION

The present invention advantageously enables more precise control of the offset amount of the axis of rotation of a roller.

In the present invention, the offset amount is corrected in consideration of the tangential force of the roller. Therefore, accurate control of a roller offset amount is made by correcting the detection of error of the trunnion stroke based on the deformation of the roller supporting mechanism, as accompanies the variation of the roller tangential force.

By further correcting a detected offset amount based on a roller clamping force, the variation of the detected offset amount based on the fluctuation of the roller clamping force can be corrected to achieve a more proper roller offset and prevent a torque shift.

By estimating a reaction force acting upon the roller offset upon fluctuation of the roller clamping force, and thus controlling the roller offset, moreover, it is possible to prevent a roller stroke that might otherwise be caused by a variation of the reaction force at an abrupt variation of an input torque. The present invention may be adapted to a method for controlling a speed change for a toroidal CVT.

BRIEF DESCRIPTION OF THE DRAWINGS

Preferred embodiments of the present invention will be described in detail based on the following figures, wherein:

FIG. 2 (*a*) and FIG. 2 (*b*) are diagrams for explaining the inclined rotation of a roller;

FIG. 8 (*a*) and FIG. 8 (*b*) are diagrams for explaining a torque shift at an abrupt varying time of an input torque.

DESCRIPTION OF THE PREFERRED EMBODIMENTS

Preferred embodiment of the invention will be described with reference to the accompanying drawings.

Figure 1:
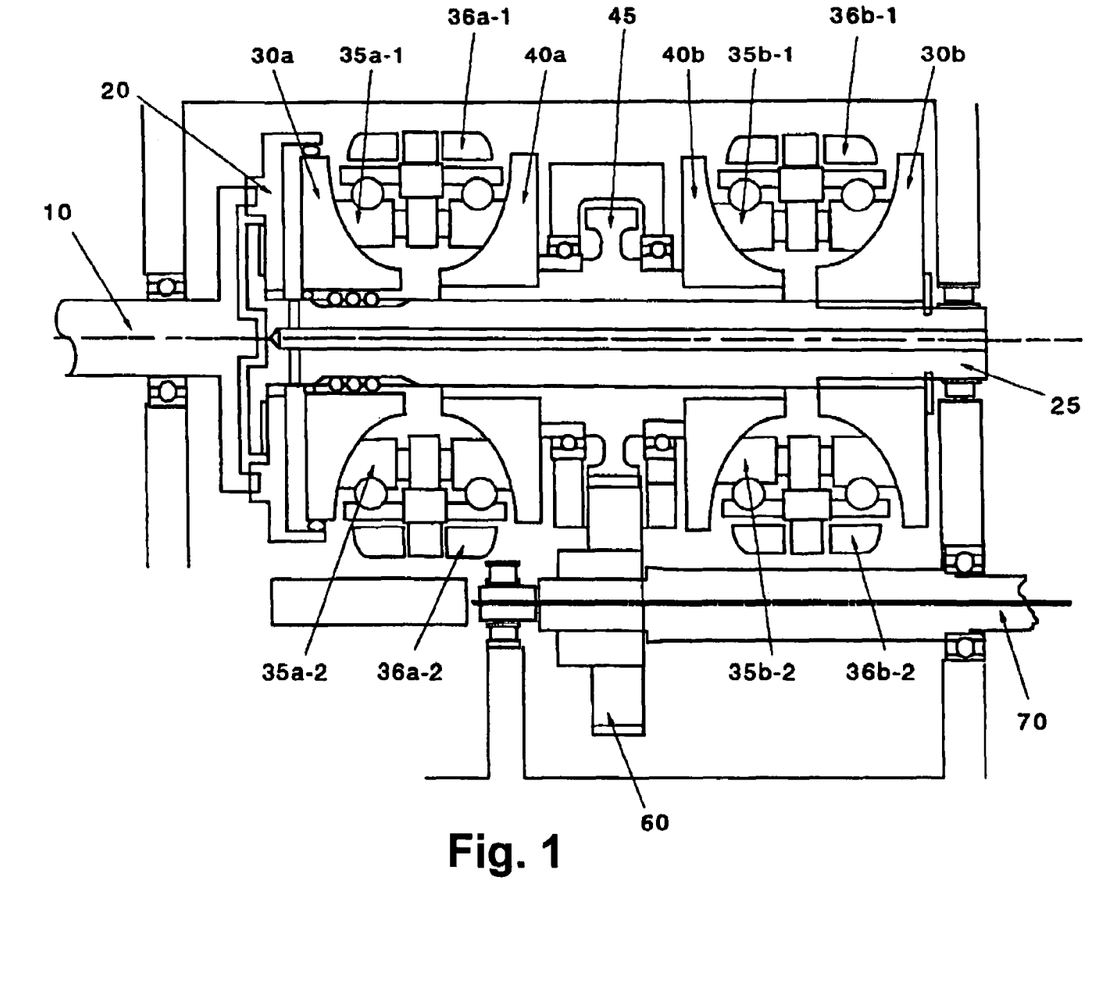
FIG. 1 is a diagram showing a construction of a toroidal CVT.

FIG. 1 shows an entire construction of a toroidal CVT according to a first preferred embodiment of the present invention. Two sets of input discs 30*a* and 30*b* are connected to an input shaft 10 rotated on the basis of rotations of an engine. These input discs 30*a* and 30*b* have openings at their centers and are shaped so as to protrude gradually from the periphery to the center, with slopes having generally arcuate shapes in their axial sections. The input disc 30*a* is located on the left side of FIG. 1, the input disc 30*b* is located on the right side of FIG. 1, and the discs 30*a* and 30*b* are positioned so that their centers confront each other. Facing the input discs 30a and 30b, respectively, are placed output discs 40a and 40b which have generally similar shapes. In other words, the input disc 30a and the output disc 40a are arranged to face each other, and the input disc 30b and the output disc 40b are arranged to face each other. In an axial direction cross section, therefore, the slopes of the input disc 30a and the output disc 40a form a pair of semicircles, and the slopes of the input disc 30b and the output disc 40b form another pair of semicircles.

Rollers 35a-1 and 35a-2 are clamped between the input/output discs 30a and 40a, and rollers 35b-1 and 35b-2 are clamped between input/output discs 30b and 40b. Specifically, the rollers 35a-1, 35a-2, 35b-1, and 35b-2 contact with the input discs 30a and 30b on one side and with the output discs 40a and 40b on the other side, so that the rotating torques of the input discs 30a and 30b are transmitted to the output discs 40a and 40b. Further, the rollers 35a-1 and 35a-2 are supported by trunnions 36a-1 and 36a-2, respectively, and the rollers 35b-1 and 35b-2 are supported by trunnions 36b-1 and 36b-2, respectively. These trunnions 36a-1, 36a-2, 36b-1, and 36b-2 have axes normal to the sheet of FIG. 1 so that they can move in the axial direction and can rotate about the axes. Moreover, the axes of the trunnions 36a-1, 36a-2, 36b-1 and 36b-2 are fixed with regard to radial directions so that the rollers 35a-1, 35a-2, 35b-1, and 35b-2 are prevented from leaving the input/output discs 30a, 40a, 30b, and 40b.

The input shaft 10 is connected to a hydraulic push (or end load) mechanism 20. This end load mechanism 20 receives oil pressure in its inside to push the input discs 30a and 30b toward the output discs 40a and 40b, respectively. As a result, clamping forces are generated between the input/output discs 40a and 40b and the input/output 30b and 40b so that the rollers 35a-1, 35a-2, 35b-1 and 35b-2 are clamped by predetermined individual pressures between the input/output discs 30a, 40a, 30b and 40b. As a result, slipping between the input/output discs 30a, 40a, 30b, and 40b and the rollers is prevented, and traction is maintained. Here, a shaft 25 makes rotations identical to those of the input shaft 10 thereby to rotate the input discs 30a and 30b. These input discs 30a and 30b are connected through thrust bearings in such a manner that they can move in the axial direction of the shaft 25.

The output discs 40a and 40b are rotatably supported on the shaft 25 through the bearings. Between the output discs 40a and 40b, there is connected an output gear 45, which rotates together with the output discs 40a and 40b. The output gear 45 meshes with a counter gear 60, to which an output shaft 70 is connected. Therefore, this output shaft 70 rotates as the output discs 40a and 40b rotate.

Moreover, the toroidal CVT is provided with a hydraulic piston chamber, the oil pressure of which controls the displacements (i.e., the trunnion strokes, the roller offset amounts) of the trunnions 36a-1, 36a-2, 36b-1, and 36b-2 in the trunnion axial direction. The gear ratios are changed by the controls of the trunnion strokes (i.e., the roller offset amounts) of those trunnions 36a-1, 36a-2, 36b-1 and 36b-2. Here, the strokes (or the roller offset amounts) of the trunnions 36a-1 and 36a-2 make compensatory adjustments so that the lines joining the centers of the trunnions 36a-1 and 36a-2 may extend through the centers of the input/output discs 30 and 40. Similarly, the strokes (or the roller strokes) of the trunnions 36b-1 and 36b-2 make compensatory adjustments so that the lines joining the centers of the trunnions 36b-1 and 36b-2 extend through the centers of the input/output discs 30 and 40.

Figure 2:
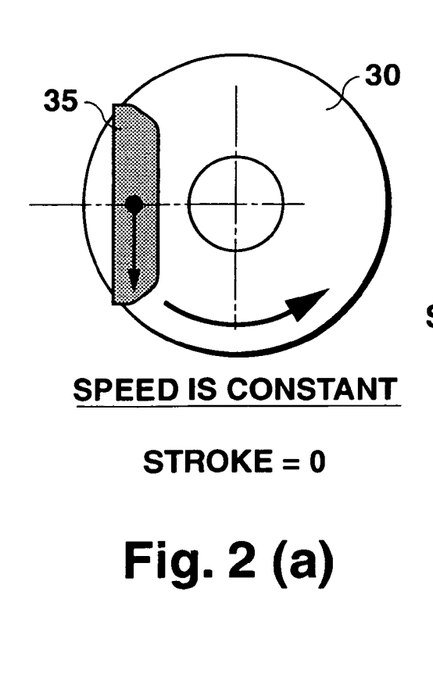

The change in the gear ratio will now be described with reference to FIG. 2 (a) and FIG. 2 (b). FIG. 2 (a) and FIG. 2 (b) are views directed at the input disc 30 from the output disc 40, showing input disc 30 and one roller 35. FIG. 2 (a) illustrates a situation in which the roller 35 is not displaced (i.e., the trunnion stroke=0), such that the axis of rotation of the roller 35 extends through the center of the input disc 30. When speeds are being changed, however, the trunnion 36 axis is offset. As shown in FIG. 2 (b), for example, the trunnion 36 is offset in the direction of rotation of the input disc 30 (i.e., upward in FIG. 2 (b)). As a result, the roller 35 is subjected, as it moves, to the circumferential rotation force of the input disc 30. Then, the roller 35 is subjected to a force (for the inclined rotation) that brings the roller to the periphery of the input disc 30. When the offset amount (i.e., the trunnion stroke) of the roller 35 returns to 0, the position of contact of the roller 35 with the input disc 30 is displaced radially outward. As a result, the position at which the roller 35 contacts with the output disc 40 is displaced radially inward to change the gear ratio (for an upshift). When the trunnion 36 is offset downward in FIG. 2 (b) (i.e. in the direction in which the input disc goes away from the roller), the trunnion 36 rotates in the opposite inclination, thereby causing a downshift.

Figure 3:
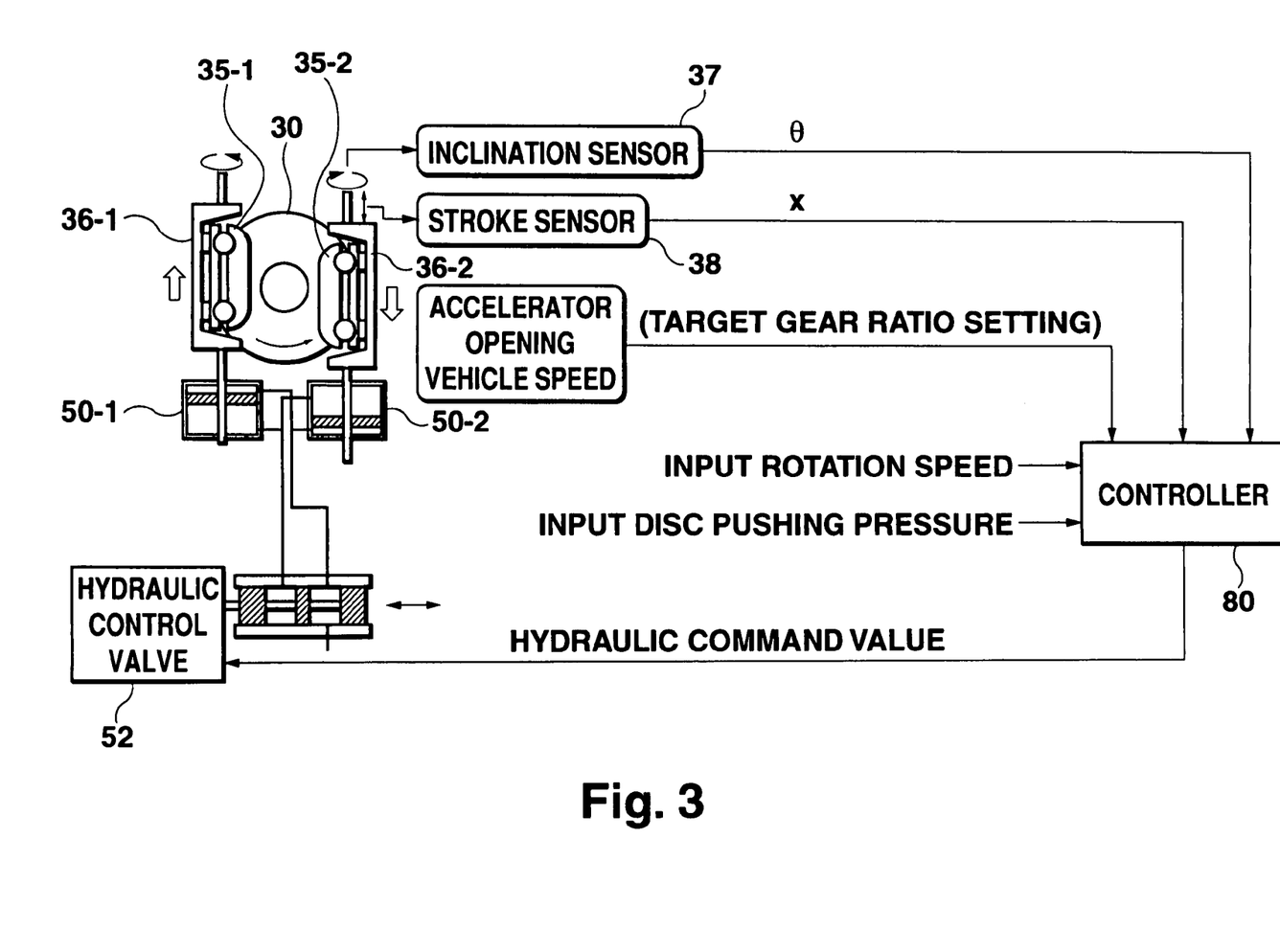
FIG. 3 is a diagram showing a configuration for controlling a trunnion stroke and an inclination.

FIG. 3 shows a construction for the gear ratio control. Here, FIG. 3 shows one input disc 30, two rollers 35-1 and 35-2 and two trunnions 36-1 and 36-2.

Thus, a hydraulic piston chamber 50 is provided with a pair of piston chambers 50-1 and 50-2 for activating the trunnions 36-1 and 36-2 complementarily. To these piston chambers 50-1 and 50-2, moreover, there is connected a hydraulic control valve 52, which controls the oil pressure to be fed to the hydraulic piston chambers 50-1 and 50-2 thereby to control the strokes (or the roller offset amounts) of the trunnions 36-1 and 36-2.

The angle of inclination $\theta$ of the trunnion 36 is detected by an inclination sensor 37, and the stroke x is detected by a stroke sensor 38. These inclination $\theta$ and stroke x are fed to a controller 80.

The information on the accelerator opening and the vehicle speed is also fed to the controller 80. This controller 80 determines a target gear ratio from the accelerator opening and the vehicle speed, and decides a target stroke on the basis of a deviation between the target gear ratio and a gear ratio corresponding to the inclination $\theta$ detected by the inclination sensor 37. On the basis of the target stroke, moreover, the controller 80 controls the hydraulic control valve 52 thereby to control the stroke x of the trunnion 36. When the present gear ratio determined from the inclination thus becomes equal to the target gear ratio, the controller 80 ends the gear ratio control.

For this speed changing control, it is sufficient to subject only the inclination $\theta$ (or the gear ratio) to a feedback control. However, the stroke x corresponds to a differential of the inclination $\theta$ and has a damping effect to inhibit vibration in the inclined rotation. Therefore, the stroke is also subjected to feedback control so that the stroke x detected by the stroke sensor 38 may be identical to the target stroke. If the contact positions between the roller 35 and the input/output discs 30 and 40 are known, the relation between the gear ratio and the inclination is determined exclusively by the geometrical shape. It is, therefore, possible to substitute the inclination for the gear ratio, and vice versa.

In FIG. 3, the gear ratio is detected in terms of the inclination of the inclination sensor 37 but may also be determined from the input shaft speed and the output shaft speed. Moreover, instead of the stroke of the trunnion 36, inclination variation, input speed change or gear ratio change may be used.

Figure 4:
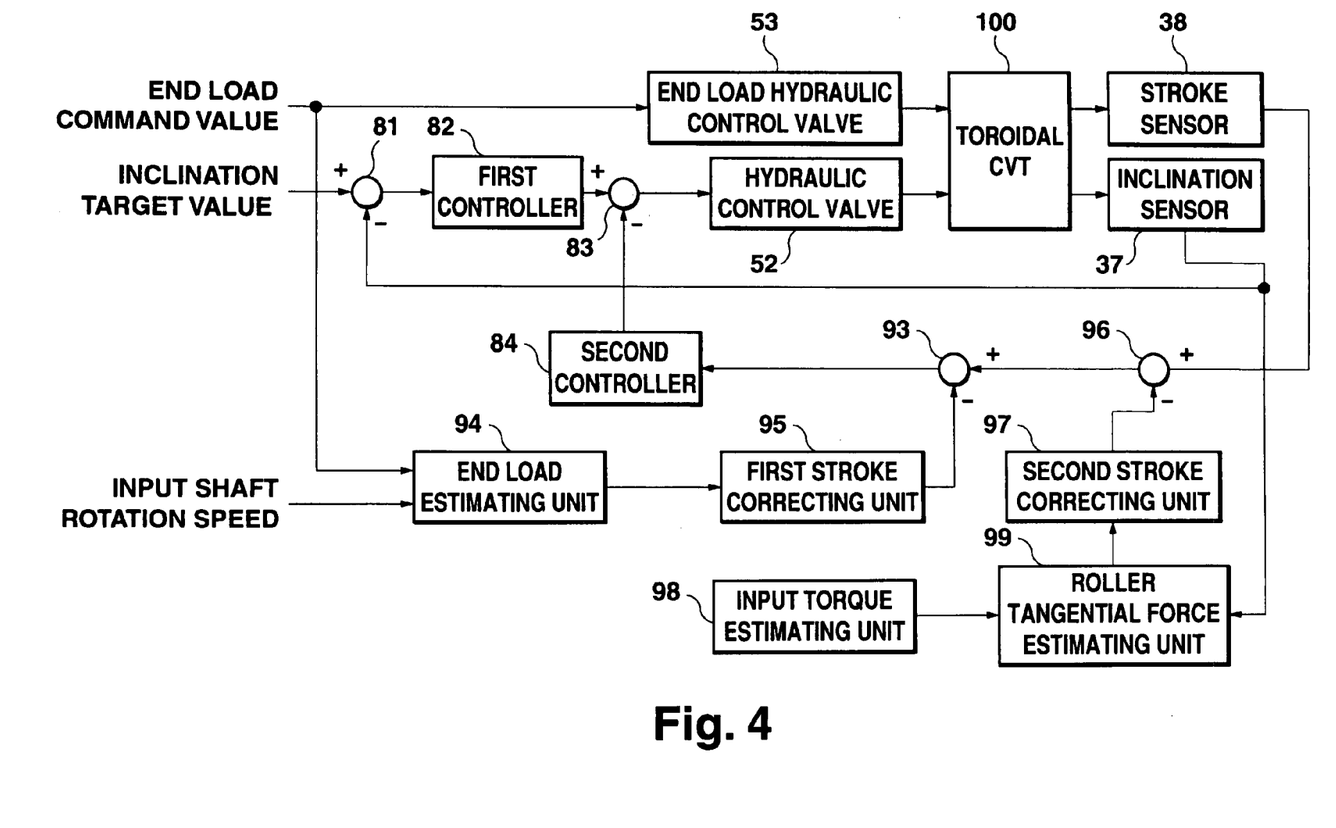
FIG. 4 is a diagram showing a configuration for controlling a stroke correction.

In this embodiment, the hydraulic control valve 52 is controlled by the controller 80 to control the stroke of the trunnion 36, as will be described with reference to FIG. 4.

In the controller 80, as described hereinbefore, the target gear ratio is determined on the basis of the accelerator opening and the vehicle speed that is input, so that the corresponding inclination target value is determined. This inclination target value is input to a subtracter 81. To this subtracter 81, there is input the detected value θ of the roller inclination, which was actually measured by the inclination sensor 37. The deviation Δθ between the inclination target value and the inclination θ at the present time is calculated and output by the subtracter 81.

The deviation Δθ or the output of the subtracter 81 is input to a first controller 82. In this first controller 82, the deviation Δθ of the inclination is multiplied by a predetermined coefficient k to calculate the feedback input value kΔθ of the inclination feedback control. This value kΔθ is the trunnion stroke which is determined according to the difference between the target gear ratio and the present gear ratio, and provides a hydraulic controlled variable corresponding to the trunnion stroke.

The output kΔθ of the first controller 82 is input to a subtracter 83. To this subtracter 83, there is also fed the feedback input value which is based on the present trunnion stroke as detected by and sent from a second controller 84. In the subtracter 83, therefore, the feedback input value based on the trunnion stroke is calculated. The flow control valve 52 is controlled accordingly, and the trunnion stroke in a toroidal CVT 100 which controls the gear ratio is thereby determined.

An end load command value, which is determined on the basis of an input torque, is fed to an end load hydraulic control valve 53, by which the end load on the toroidal CVT is controlled to a predetermined pressure so as to inhibit slipping between the roller and the disc.

On the other hand, the present trunnion stroke is detected by the stroke sensor 38, and the second controller 84 determines a feedback factor on the basis of the present stroke. In this embodiment, however, the feedback input value to be fed to the subtracter 83 is corrected according to the input torque.

Specifically, the stroke detected by the stroke sensor 38 is not fed directly to the second controller 84 but is input to a subtracter 93. A stroke correcting factor from a first stroke correcting unit 95 is also input to the subtracter 93, in which the stroke correcting factor is subtracted from the detected stroke, so that the corrected stroke is fed to the second controller 84. In the first stroke correcting unit 95, precision of control can be further improved by considering the influences of the thermal deformation of the members and the heat characteristics of the stroke sensor 38.

Correction in the first stroke correcting unit 95 will next be described. The trunnion 36 supports the roller 35, but the input/output disc clamping force (or the end load) varies with the input torque. As the input torque increases, the transmission power increases, making it necessary to increase the traction force between the input/output disc and the roller and to increase the contacting face pressure between the disc and the roller. This is accomplished by the end load mechanism 20, which controls the disc and the roller according to variation in the input torque so that the disc and the roller will neither slip nor have unnecessarily large surface pressure.

Figure 5:
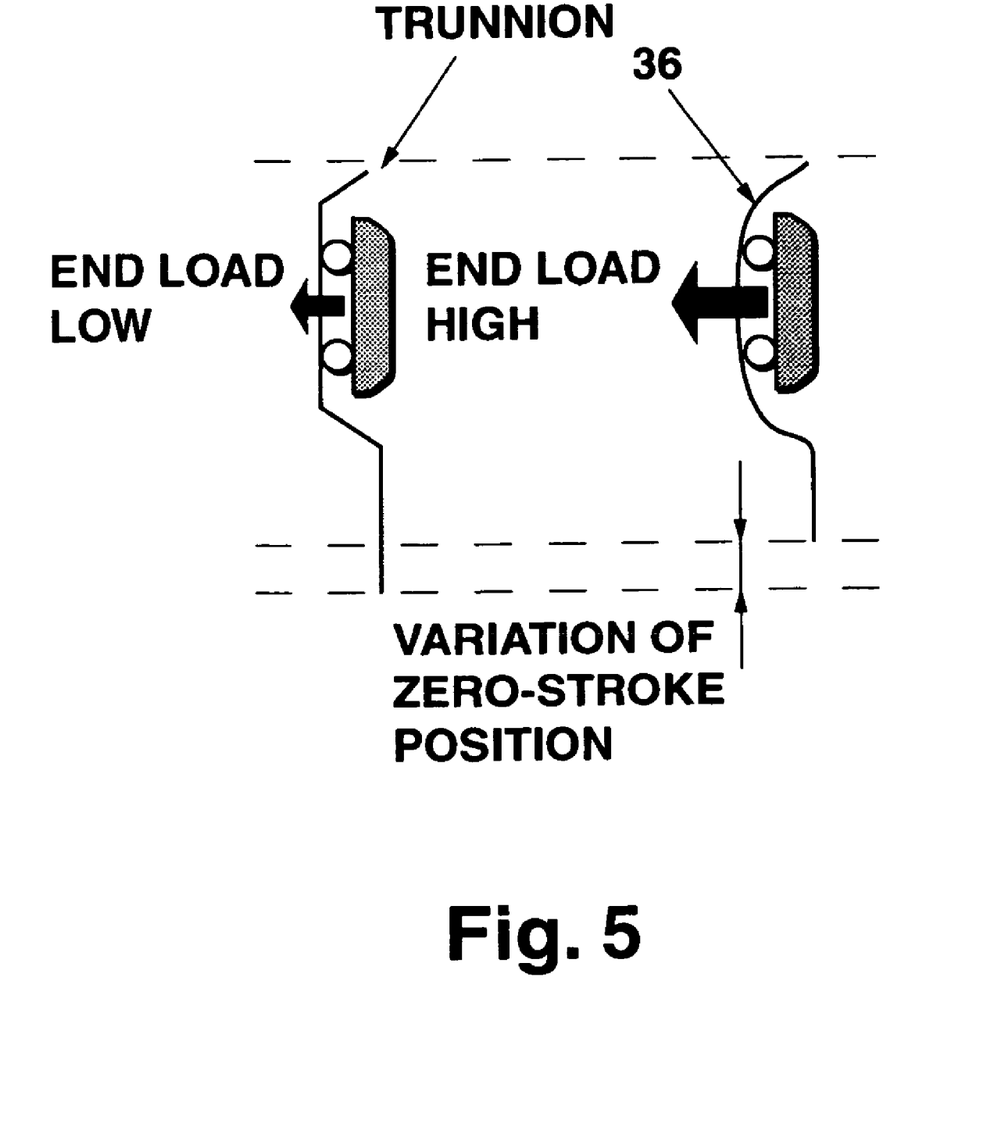
FIG. 5 is a diagram for explaining a zero-stroke position change.

However, such variation in the end load leads to deformation of the trunnion 36. As shown in FIG. 5, the trunnion 36 is pushed by the roller 35 so as to bulge outward. As a result, the detected value of the trunnion stroke varies although the position of the trunnion 36 itself is unchanged. This is because the trunnion stroke is usually detected at the leading end position of the trunnion 36, as shown in FIG. 3. According to this method, when the trunnion 36 bulges to the outer side as the end load increases, its length becomes shorter as the bulge becomes larger, and the stroke is detected. Alternatively, the input/output discs 30 and 40 and the roller 35 is deformed by the end load variation and, as a result of this deformation, the zero-stroke position of the trunnion 36, which is then subjected to no force to incline the roller, adjusts to establish an inclining force, even if the detected value of the trunnion stroke is unchanged. Thus, a speed change occurs and the actual gear ratio deviates from the target gear ratio. This phenomenon is called "torque shift".

In the present embodiment, the first stroke correcting unit 95 calculates the detection error of the trunnion stroke sensor occurring as the trunnion deformation occurs, based on the data of the end load coming from the end load estimating unit 94. Here, this detection error varies according to the material/structure of the trunnion 36. Therefore, the detection error may preferably be predetermined experimentally for each apparatus, with the errors corresponding to various factors stored as a map. Moreover, the relationships between the end load and the stroke detection error can also be prepared as numerical formulas. Such preparation can reduce the required memory capacity.

Here, the end load estimating unit 94 estimates either the end load applied between the input/output discs through the end load hydraulic control valve 53 in accordance with the end load command value, or the end load estimated considering the static oil pressure determined from the measured end load piston oil pressure and the centrifugal oil pressure calculated from the input shaft rotation speed.

The error from the first stroke correcting unit 95 is fed to the subtracter 93, where it is subtracted from the detection stroke coming from the stroke sensor to obtain an error-corrected trunnion stroke.

The present embodiment is configured such that the output of the stroke sensor 38 is fed to the subtracter 93 through a subtracter 96. To this subtracter 96, the correction factor is fed from a second stroke correcting unit 97 thereby to correct the error of the trunnion stroke.

Specifically, a roller tangential force is fed from a roller tangential force estimating unit 99 to the second stroke correcting unit 97, and the second stroke correcting unit 97 estimates the trunnion stroke error due to the deformation in the peripheries of the roller supporting bearings due to the roller tangential force and the axial direction deformation (e.g., elongation or compression) of the trunnion, and issues the correction factor for correcting that error.

The input torque from an input torque estimating unit 98 and the roller inclination from the inclination sensor 37 are fed to the roller tangential force estimating unit 99 which uses these values to calculate the roller tangential force. In short, the roller tangential force is calculated by dividing the input torque by the radius of gyration of the roller contact which is calculated from the roller inclination. In this embodiment, each of the two controllers has two contacts and two rollers Therefore, the roller tangential force is calculated by:

Roller Tangential Force=(No. of Contacts: 2)×(Input Torque)/(No of Rollers: 2)/(Radius of Gyration of Input side Contact Point).

Here, the gyration radius of the input side contact point of the roller (i.e., the point of contact between the input disc and the roller) and the gyration radius of the output side contact of the roller (i.e., the point -of contact between the output disc and the roller) have a one-to-one relationship determined according to the inclination. Therefore, the roller tangential force to be calculated may be that of either contact, and the trunnion stroke can be likewise corrected by using either value.

Here, the input torque estimating unit 98 estimates the input torque by detecting the engine output torque, which is calculated from the throttle opening, the fuel injection rate or the like, or the transmission torque of the input shaft with the torque sensor.

Figure 6:
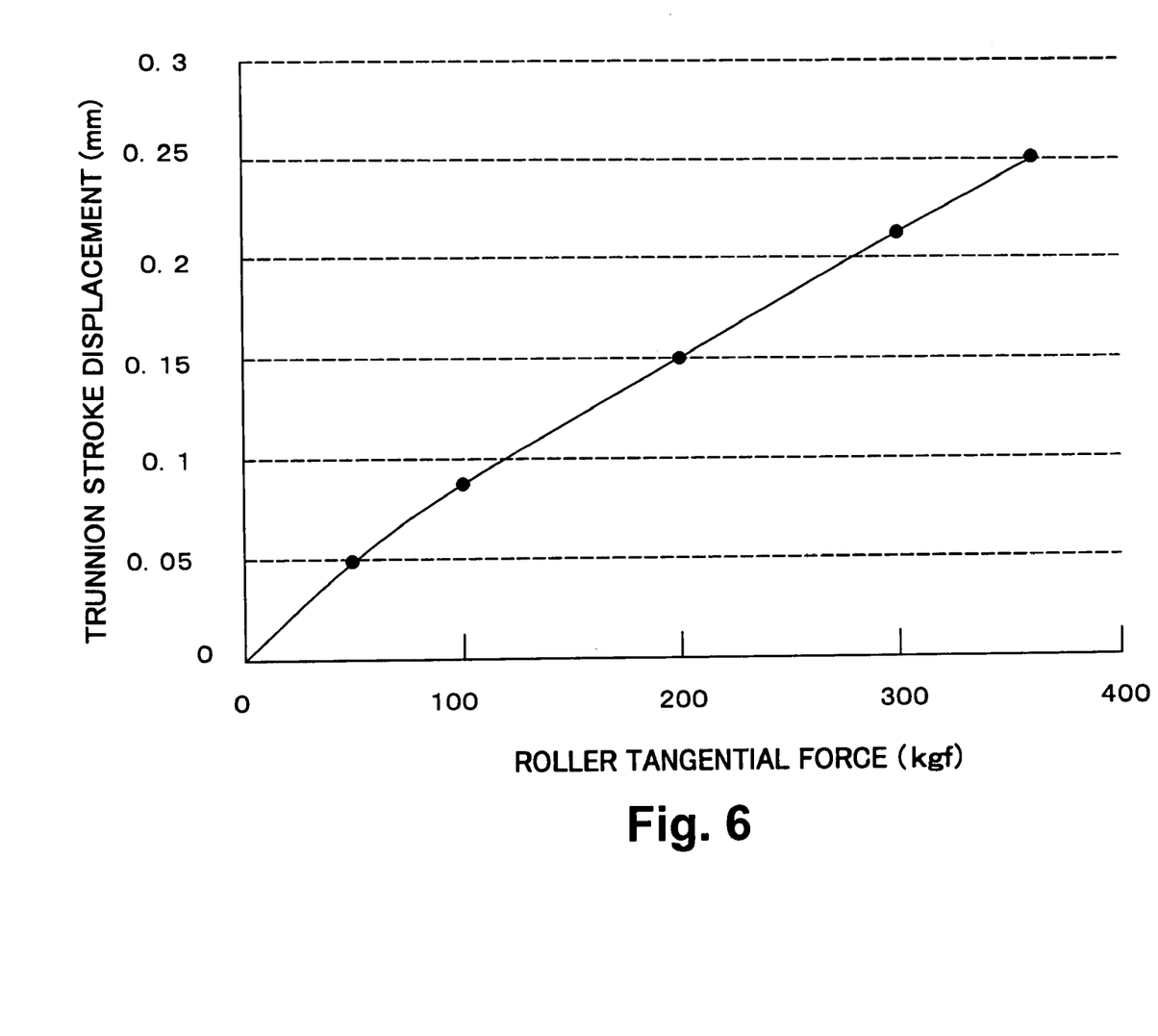
FIG. 6 is a diagram showing a relation between a roller tangential force and a displacement of the trunnion stroke in an offset direction.

On the other hand, the second stroke correcting unit 97 calculates the correction factor from the roller tangential force thus obtained, and utilizes the characteristics shown in FIG. 6. Specifically, FIG. 6 shows the changing state of the trunnion stroke (=the offset amount) relative to the roller tangential force. In this example, the trunnion stroke (=the offset amount) has a displacement of about 0.08 mm where tangential force is about 100 Kgf, and a displacement of about 0.21 mm where the tangential force is about 300 KGf. The offset amount increases substantially linearly for the increase in the tangential force because the mechanical deformation in the peripheries of the roller supporting bearings and the axial deformation of the trunnions which occurs when the roller tangential force causes elastic deformations of the bearing portions and the trunnion shaft portion in the roller tangential direction. As shown in FIG. 1 and FIG. 3, specifically, the rollers 35-1 and 35-2 are supported by the trunnions 36-1 and 36-2, but they are rotatably supported through the bearings. Moreover, the trunnion stroke position is determined and the end portions of the trunnion shafts are supported with the oil pressures of the piston chambers 50-1 and 50-2. In response to the tangential forces applied to the rollers 35-1 and 35a-2, therefore, those trunnion shafts and bearings are elastically deformed to cause an error in the detected value of the trunnion stroke.

Moreover, the deformation of the trunnion in the offset direction is proportional to the roller tangential force, as shown in FIG. 6. Therefore, in the second stroke correcting unit 97 is stored the relations of FIG. 6 as a map or in the form of a linear equation and generates the correction factor corresponding to the roller tangential force input.

Thus, the trunnion stroke corrected for errors in the two stages by the two subtracters 96 and 93 is fed to the second controller 84. In the second controller 84, therefore, the feedback input value can be determined on the basis of the trunnion stroke, from which the errors due to the magnitude of the end load and the roller tangential force are eliminated, and can be fed to the subtracter 83.

In the second controller 84, specifically, a feedback input value kx on the trunnion stroke, which is calculated by multiplying the present corrected trunnion stroke x by a predetermined coefficient k, is fed to the subtracter 83. Here, this feedback input value kx is also the value for hydraulic control of the target trunnion stroke.

In the subtracter 83, therefore, the difference between the controlled variable kθ of the target trunnion stroke and the controlled variable kx based on the actual trunnion stroke x is calculated and is fed as the control amount of the hydraulic control valve 52 to the hydraulic control valve 52. In short, feedback control is made on the trunnion stroke.

The oil pressure controlled by the hydraulic control valve 52 is fed to the trunnion 36 of the toroidal CVT 100 so that its stroke is controlled. By this stroke control, moreover, the inclination is varied so that the gear ratio control is made to match the target gear ratio.

Figure 7:
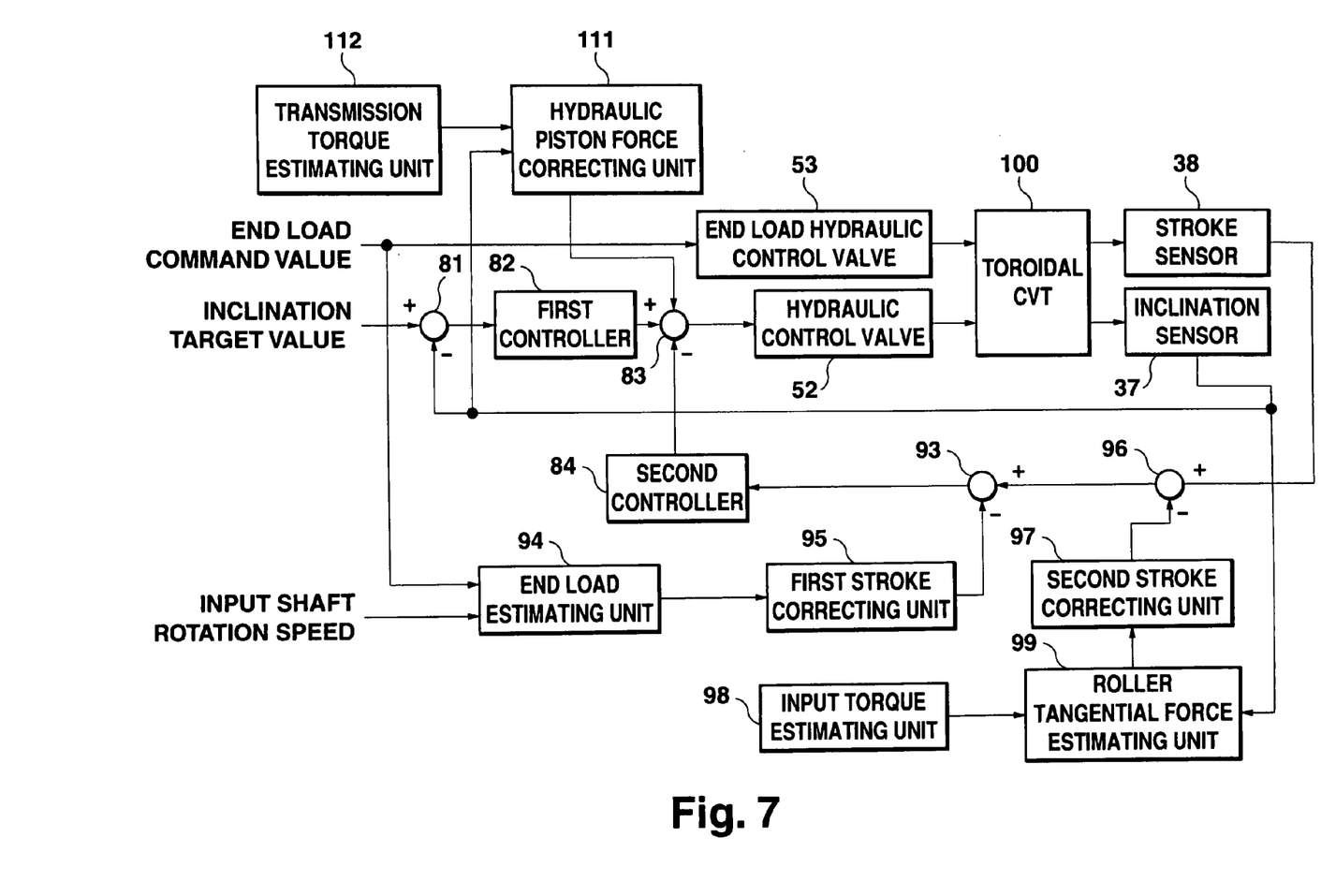
FIG. 7 is a diagram showing a configuration for controlling a hydraulic piston force correction.

FIG. 7 shows another embodiment of the present invention. According to the configuration of this further embodiment, the invention is additionally provided with a hydraulic piston force correcting unit 111. This hydraulic piston force correcting unit 111 calculates the hydraulic piston force (correction value) necessary to prevent the rolling of inclination of the roller in the event of abrupt variation in the input torque as predicted from both the estimated transmission torque value from a transmission torque estimating unit 112 and the present inclination information from the roller inclination sensor 37. The hydraulic piston force correcting unit 111 feeds the calculated correction value to the subtracter 83 with, making it possible to prevent the rolling of inclination of the roller when there is abrupt variation in the input torque.

Figure 8:
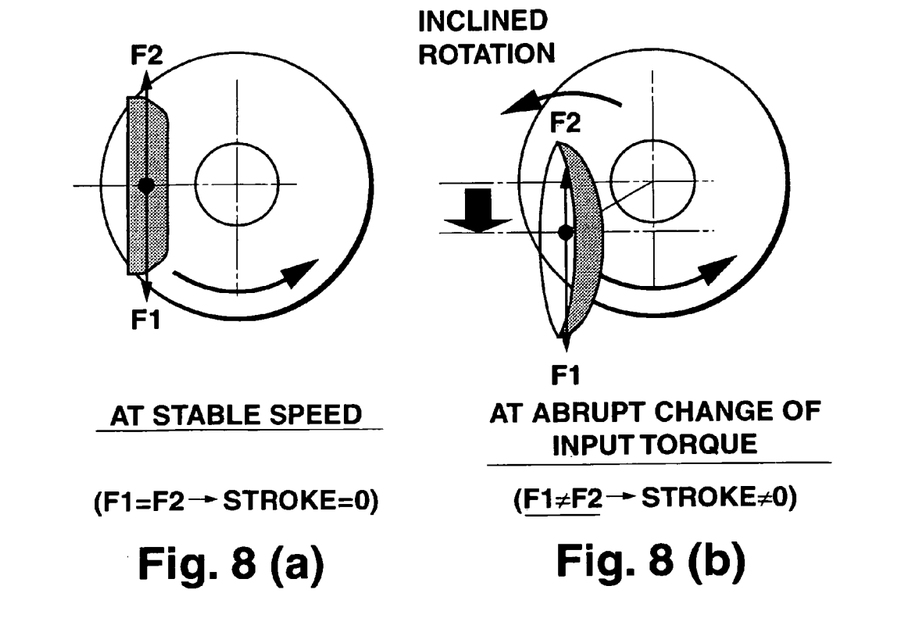

In other words, the end load is changed in response to the variation in the input torque, as described above. When the end load varies, the zero-stroke position changes. Moreover, when the input torque abruptly varies, the stroke position is changed by an abrupt reaction force upon the trunnion. During stable speed operation, as shown in FIG. 8 (*a*) and FIG. 8 (*b*), a force F1 to be applied from the disk to the roller in the torque transmission direction is balanced by the hydraulic piston force of the hydraulic piston chamber 50. When the input torque abruptly changes, however, the relation of F1=F2 cannot be kept due to the response delay of the feedback line, so that a stroke is generated which changes the roller inclination, causing torque shift.

In this embodiment, the hydraulic piston force correcting unit 111 estimates the reaction force upon the hydraulic piston of the hydraulic piston chamber 50, based on the transmission torque and the inclination or the gear ratio (or the pressure pushing on the disc and the traction coefficient). The hydraulic piston force correcting unit 111 calculates the correction factor for calculating the command value of the flow control valve to prevent this reaction force from changing the stroke. As a result, the oil pressure in the flow control valve 52 is controlled. Therefore, the torque shift by the hydraulic reaction force can be effectively prevented. Especially, this correction control is feed forward control using the roller clamping force and so it is effective in compensating for the response delay of the feedback line.

Figure 9:
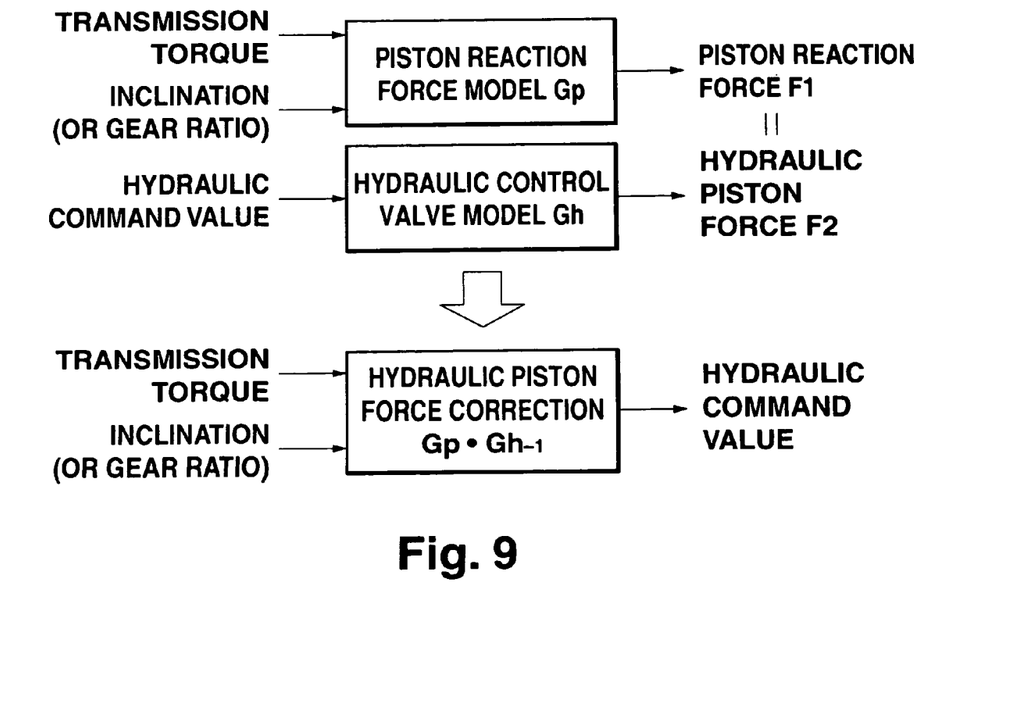
FIG. 9 is a diagram for explaining a configuration of a hydraulic piston force correcting unit 111.

As shown in FIG. 9, torque shift is inhibited when the piston reaction force and the hydraulic piston force dynamically coincide. That is, the output (the piston reaction force F1) coming from the piston reaction force model Gp which is the dynamic characteristic model outputting the piston reaction force F1 derived from the transmission torque and the inclination or the gear ratio (or the disc pushing force and the traction coefficient), and the output coming from the flow control valve (or the hydraulic pressure control valve 52) model Gh which is the dynamic characteristic model outputting the hydraulic piston force F2 derived from the hydraulic pressure command coincide with each other. Therefore, the hydraulic piston correcting unit 111 outputting the hydraulic pressure command vale drived from the transmission torque and the inclination or the gear ratio (or the disc pushing force and the traction coefficient) can be expressed by $GP \cdot Gh^{-1}$.

What is claimed is:

1. A speed change control apparatus for a toroidal CVT, comprising:
    a toroidal transmission member including an input disc, an output disc, and a roller to perform power transmissions by frictional engagement between the input disc and the output disc;
    a clamping device to clamp the roller by pushing the input and output discs;
    a speed change control unit to vary the inclination of the roller by offsetting the axis of rotation of the roller from the position in which the axis of rotation of the roller and the axis of rotation of the input/output disc intersect at a right angle, to thereby control a gear ratio;
    an offset amount detecting unit to detect an amount of the offset;
    a roller tangential force estimating unit to estimate a roller tangential force which is the force in the roller tangential direction as is determined on the basis of an input torque transmitted from the input disc to the roller and the contact position between the roller and the input disc; and an offset amount fluctuation estimating unit to estimate a fluctuation amount of the offset caused by a fluctuation of the clamping force of the clamping device, wherein the offset amount detected by the offset detecting unit is corrected based on the roller tangential force estimated in the roller tangential force estimating unit, so that the offset amount by the speed change control unit is controlled on the basis of the corrected offset amount, wherein the roller tangential force estimating unit estimates the roller tangential force on the basis of a value which is determined by dividing the input torque input to the toroidal transmission member by the radius of gyration of the contact point of the roller with the input disc or the output disc, and wherein the offset amount is also corrected based on the fluctuation amount estimated by the offset fluctuation amount estimating unit, so that the offset by the speed control unit is controlled on the basis of the corrected offset amount.

2. An apparatus as set forth in claim 1, wherein the offset amount fluctuation estimating unit stores the relation between the clamping force and the fluctuation amount of the offset in advance, and estimates the fluctuation amount of the offset by utilizing the stored relation.

3. An apparatus as set forth in claim 1, further comprising: a reaction force estimating unit to estimate a reaction force generated in response to the offset of the axis of rotation of the roller by the speed change control unit, based on the clamping force by the clamping device, and, wherein a driving force at the time of the offset of the axis of rotation of the roller by the speed change control unit is controlled on the basis of the reaction force estimated by the reaction force estimating unit.

4. An apparatus as set forth in claim 3, wherein the reaction force estimating unit estimates the reaction force on the basis of a transmission torque of the toroidal transmission member and the inclination.

5. An apparatus as set forth in claim 1, further comprising: a reaction force estimating unit to estimate a reaction force generated in response to the offset of the axis of rotation of the roller by the speed change control unit, based on the clamping force by the clamping device, and, wherein a driving force at the time of the offset of the axis of rotation of the roller by the speed change control unit is controlled on the basis of the reaction force estimated by the reaction force estimating unit.

6. An apparatus as set forth in claim 5, wherein the reaction force estimating unit estimates the reaction force on the basis of a transmission torque of the toroidal transmission member and the inclination.

7. An apparatus as set forth in claim 1, wherein the clamping device applies a pressure between the input/output discs with an oil pressure.

8. An apparatus as set forth in claim 1, wherein an oil pressure is utilized for the offset of the axis of rotation of the roller.

9. A speed change control method for a toroidal CVT including:

a toroidal transmission member including an input disc, an output disc, and a roller for performing power transmissions by frictional engagement between the input disc and the output disc; and a clamping device for clamping the roller by pushing the input/output disc, the method comprising:

varying the inclination of the roller by offsetting the axis of rotation of the roller from the position in which the axis of rotation of the roller and the axis of rotation of the input/output disc intersect at a right angle, thereby to control the gear ratio;

detecting an amount of the offset;

estimating a roller tangential force which is the force in the roller tangential direction determined on the basis of an input torque transmitted from the input disc to the roller and the contact position between the roller and the input disc; and estimating a fluctuation amount of the offset, caused by a fluctuation of the clamping force of the clamping device, wherein the offset amount detected by the offset detecting is corrected based on the roller tangential force estimated in the roller tangential force estimating, so that the offset amount by the speed change control is controlled on the basis of the corrected offset amount, and wherein the offset amount is also corrected based on the fluctuation amount estimated at the offset fluctuation estimating, so that the offset amount at the speed control is controlled on the basis of the corrected offset amount.

10. A method as set forth in claim 9, further comprising: estimating a reaction force generated in response to the offset of the axis of rotation of the roller at the speed change control step based on the clamping force by the clamping device, wherein a driving force at the time of the offset of the axis of rotation of the roller at the speed change control step is controlled on the basis of the reaction force estimated by the reaction force estimating step.

11. A speed change control method for a toroidal CVT including:

a toroidal transmission member including an input disc, an output disc, and a roller for performing power transmissions by frictional engagement between the input disc and the output disc; and a clamping device for clamping the roller by pushing the input and output discs, the method comprising:

varying the inclination of the roller by offsetting the axis of rotation of the roller from the position in which the axis of rotation of the roller and the axis of rotation of the input/output disc intersect at a right angle, thereby controlling the gear ratio;

detecting an amount of the offset;

estimating a roller tangential force which is the force in the roller tangential direction determined on the basis of an input torque transmitted from the input disc to the roller and the contact position between the roller and the input disc; and estimating a fluctuation amount of the offset, caused by a fluctuation of the clamping force of the clamping device, wherein the offset amount detected by the offset detecting is corrected based on the roller tangential force estimated in the roller tangential force estimating, so that the offset amount by the speed change control is controlled on the basis of the corrected offset amount, and wherein the offset amount is also corrected based on the fluctuation amount estimated at the offset fluctuation estimating, so that the offset amount at the speed control is controlled on the basis of the corrected offset amount.

* * * * *